(12) United States Patent
Kobayashi et al.

(10) Patent No.: US 8,066,422 B2
(45) Date of Patent: Nov. 29, 2011

(54) MATERIAL MOISTURE CONTENT ADJUSTMENT METHOD

(75) Inventors: Ichizou Kobayashi, Tokyo (JP); Takeshi Sasakura, Tokyo (JP); Toshiyuki Tanaka, Tokyo (JP); Katsuhiro Uemoto, Tokyo (JP); Makoto Nakajima, Tokyo (JP)

(73) Assignee: Kajima Corporation, Tokyo (JP)

( * ) Notice: Subject to any disclaimer, the term of this patent is extended or adjusted under 35 U.S.C. 154(b) by 268 days.

(21) Appl. No.: 11/909,499

(22) PCT Filed: Mar. 27, 2006

(86) PCT No.: PCT/JP2006/306982
§ 371 (c)(1),
(2), (4) Date: Sep. 24, 2007

(87) PCT Pub. No.: WO2006/104227
PCT Pub. Date: Oct. 5, 2006

(65) Prior Publication Data
US 2009/0016149 A1    Jan. 15, 2009

(30) Foreign Application Priority Data

Mar. 29, 2005    (JP) .................................. 2005-093678

(51) Int. Cl.
*B01F 15/06* (2006.01)
*B01F 15/02* (2006.01)
*B01F 3/18* (2006.01)
*B01F 3/12* (2006.01)
*B01F 3/20* (2006.01)
*B01F 3/22* (2006.01)
*B28C 3/00* (2006.01)
*C09K 17/02* (2006.01)
*G21F 9/36* (2006.01)

(52) U.S. Cl. .............................................. 366/4; 366/7
(58) Field of Classification Search ................. 137/892; 366/4, 7, 163.1, 167.2
See application file for complete search history.

(56) References Cited

U.S. PATENT DOCUMENTS
2,595,631 A * 5/1952 Bertsch ............................ 366/7
(Continued)

FOREIGN PATENT DOCUMENTS
DE 101 54 704 A1 * 5/2003
(Continued)

OTHER PUBLICATIONS
Machine translation (JPO) of JP 06-277478 A, generated Jul. 1, 2009.*
(Continued)

Primary Examiner — Tony G SooHoo
(74) Attorney, Agent, or Firm — Pearne & Gordon LLP

(57) ABSTRACT

When making moisture content adjustment by adding liquid such as water to a raw material such as pulverulent material including bentonite, uniform mixing of the liquid such as water with the raw material is given with relatively simple facilities, moisture content adjustment of a large quantity of raw materials is attainable, and besides, a material having satisfactory performances such as impermeability is obtainable through uniform moisture content adjustment. Within a mixing tank (1) configured with a normal powder mixer kept at low temperatures, pulverulent bentonite (A) and fine granular ice (B) are stirred and mixed. Stirring and mixing of the fellow pulverulent materials are adapted to uniformly mix the pulverulent bentonite (A) and the fine granular ice (B), enabling uniformly moisture content-adjusted bentonite to be obtained. A liquid-nitrogen gas bomb (21), for instance, is connected to the mixing tank (1), causing the inside of the mixing tank to be kept at low temperatures with nitrogen gas supplied from the bomb, before putting the prepared fine granular ice (B) through an inlet port (20).

19 Claims, 2 Drawing Sheets

U.S. PATENT DOCUMENTS

| | | | | |
|---|---|---|---|---|
| 2,758,445 | A * | 8/1956 | Saxe | 62/63 |
| 3,361,413 | A * | 1/1968 | Heyl | 366/137 |
| 3,404,541 | A * | 10/1968 | Bot-Langlet | 62/314 |
| 3,583,172 | A * | 6/1971 | Koudelka et al. | 62/70 |
| 3,590,540 | A * | 7/1971 | Johnson et al. | 52/309.13 |
| 3,645,101 | A * | 2/1972 | Sherard | 405/267 |
| 3,684,253 | A | 8/1972 | Bevan | |
| 3,767,170 | A * | 10/1973 | Morgenstern | 366/3 |
| 3,829,992 | A * | 8/1974 | Reid et al. | 37/461 |
| 3,925,992 | A * | 12/1975 | Backstrom | 588/17 |
| 4,021,021 | A * | 5/1977 | Hall et al. | 366/156.1 |
| 4,048,373 | A * | 9/1977 | Clem | 428/454 |
| 4,072,530 | A * | 2/1978 | Hirame et al. | 501/89 |
| 4,090,363 | A * | 5/1978 | List et al. | 405/109 |
| 4,095,988 | A * | 6/1978 | Jancek et al. | 106/706 |
| 4,180,350 | A * | 12/1979 | Watts | 405/233 |
| 4,193,716 | A * | 3/1980 | Piccagli | 405/267 |
| 4,479,362 | A * | 10/1984 | McWhorter et al. | 62/63 |
| 4,496,268 | A * | 1/1985 | Ressi di Cervia | 405/133 |
| 4,534,926 | A * | 8/1985 | Harriett | 264/281 |
| 4,601,615 | A * | 7/1986 | Cavalli | 405/267 |
| 4,615,352 | A * | 10/1986 | Gibot | 137/7 |
| 4,656,062 | A * | 4/1987 | Harriett | 427/397.8 |
| 4,685,810 | A * | 8/1987 | Sakuichi et al. | 366/182.1 |
| 4,877,358 | A * | 10/1989 | Ressi di Cervia | 405/267 |
| 4,919,989 | A * | 4/1990 | Colangelo | 428/66.4 |
| 4,936,386 | A * | 6/1990 | Colangelo | 166/292 |
| 5,100,239 | A * | 3/1992 | Ono et al. | 366/7 |
| 5,104,232 | A * | 4/1992 | Lennox, III | 366/227 |
| 5,360,622 | A * | 11/1994 | Yokoyama | 426/549 |
| 5,388,771 | A * | 2/1995 | Tsau | 241/17 |
| 5,388,772 | A * | 2/1995 | Tsau | 241/17 |
| 5,433,519 | A * | 7/1995 | Irsch | 366/3 |
| 5,476,142 | A * | 12/1995 | Kajita | 166/294 |
| 5,482,550 | A * | 1/1996 | Strait | 106/677 |
| 5,505,566 | A * | 4/1996 | Gruber | 406/12 |
| 5,582,351 | A * | 12/1996 | Tsau | 241/17 |
| 5,722,800 | A * | 3/1998 | Esters | 405/267 |
| 5,769,537 | A * | 6/1998 | Stromberg et al. | 366/163.1 |
| 5,779,408 | A * | 7/1998 | Amodeo | 409/218 |
| 5,782,970 | A * | 7/1998 | Zawada | 106/681 |
| 6,074,085 | A | 6/2000 | Scarpa et al. | |
| 6,132,820 | A * | 10/2000 | Callahan | 428/15 |
| 6,637,977 | B2 * | 10/2003 | Hayashi et al. | 405/59 |
| 2002/0015356 | A1 | 2/2002 | Haverland | |
| 2002/0056764 | A1 | 5/2002 | Sugiura | |
| 2003/0021631 | A1 * | 1/2003 | Hayashi et al. | 405/55 |
| 2004/0031754 | A1 | 2/2004 | Pesiri et al. | |

FOREIGN PATENT DOCUMENTS

| | | |
|---|---|---|
| JP | 06114823 A * | 4/1994 |
| JP | 6-277478 A | 10/1994 |
| JP | 9-67566 A | 3/1997 |
| JP | 11-169700 A | 6/1999 |
| JP | 11-253774 A | 9/1999 |
| JP | 11-303039 A | 11/1999 |
| NL | 9400248 A | 10/1995 |
| RU | 2092203 C1 * | 10/1997 |

OTHER PUBLICATIONS

Supplementary European Search Report dated Aug. 3, 2010 issued in European Application No. EP06730930, 6 pages.

* cited by examiner

MATERIAL MOISTURE CONTENT ADJUSTMENT METHOD

TECHNICAL FIELD

The present invention relates to a method of moisture content adjustment of materials such as pulverulent materials, and more particularly, to a method effective in moisture content adjustment of bentonite used for disposals such as geological disposals of radioactive wastes.

BACKGROUND ART

High-level radioactive wastes included in radioactive wastes yielded from nuclear power generation include liquid wastes separately obtained by spent nuclear fuel reprocessing. More specifically, the high-level radioactive wastes show a high radioactivity level, and besides, contain a large number of radioactive nuclides having so extended life as to continue to hold radioactivity over a long period of time. For that purpose, such high-level radioactive wastes are given stabilizing by being processed into vitrified wastes in such a manner as to pour these radioactive wastes in a molten state into stainless steel canisters together with glass materials, followed by being reserved for several ten years for the sake of cooling. Afterwards, the canisters containing the vitrified wastes are received etc. in an airtight state into thick steel plate-made airtight containers called overpack to provide waste matters, causing the waste matters to be buried in stable underground stratums having a depth of 300 m or more (specified in the law).

This type of geological disposals of the radioactive wastes is supposed to take measures to guarantee the safety with a multiple barrier system constructed by a combination of artificial barriers including bentonite buffer materials around the waste matters with natural barriers including bedrock. The artificial barriers serve to reduce a rate of emission of nuclides from the waste matters to the natural barriers. The natural barriers serve to retard migration of the nuclides toward the biosphere.

The bentonite is a general term of a group of resource minerals containing, as main components, montmorillonite included in clay minerals, and, as coexistent mineral components, minerals such as quartz, calcite and plagioclase. The montmorillonite is in the form of thin planar crystals (about 0.2 μm in length), and presents impermeability because application of pressures by processing such as compaction after swelling by absorption of water into inter-crystal voids brings about stratification. The montmorillonite also may prevent interlayer water from being migrated because water molecules suffer ion-mannered attraction in electric double layers, causing inter-layer clearances to be narrowed under pressures. For the above reasons, the bentonite is used as impermeable materials. As for the geological disposals of the radioactive wastes, use of the bentonite is made from the viewpoint of its performances such as impermeability with respect to underground water, buffering with respect to bedrock pressures and retardation of radioactive nuclide migrations.

In the existing idea of the geological disposals of the radioactive wastes, the bentonite-contained artificial barriers are schemed in such a manner as to be constructed by giving compaction with a heavy construction machine to, or static compression to the bentonite having undergone adjustment to a prescribed moisture content. It is indefinitely supposed that moisture content adjustment in this case is made by means of water adding in advance of sufficient stirring and mixing or by means of water sprinkling.

By the way, Patent documents 1 to 6 are in existence as prior art literatures related to the present invention. Inventions described in Patent documents 1 and 2 are those relating to a bentonite preparation method. Inventions described in Patent Documents 3 to 6 are those relating to a concrete preparation method of kneading concrete using small cakes of ice as a substitute for water.

[Patent Document 1] Japanese Patent Laid-open Hei 8-277108
[Patent Document 2] Japanese Patent Laid-open Hei 6-293512
[Patent Document 3] Japanese Patent Laid-open 2002-144325
[Patent Document 4] Japanese Patent Laid-open 2002-11709
[Patent Document 5] Japanese Patent Laid-open 2001-293718
[Patent Document 6] Japanese Patent Laid-open Hei 6-179209

The moisture content adjustment of bentonite is indefinitely supposed to be made by means of water adding in advance of sufficient stirring and mixing or by means of water sprinkling, in which case, however, an attempt to merely add water to the pulverulent bentonite or sprinkle the pulverulent bentonite with water causes only the bentonite in contact with water to be turned into granular lumps having high moisture contents, resulting in a remarkable lack in uniformity. Further, a powerful mixer is required to stir and mix hydrous bentonite until its uniformity is obtained, and besides, it is necessary to stop the mixer several times during stirring and mixing in order to remove the bentonite cohered to a mixing blade and/or a mixing tank. For this reason, an attempt to make the moisture content adjustment of a huge quantity of bentonite required for construction of the bentonite-contained artificial barriers is at variance with the reality. In addition, stirring and mixing in a continuous manner have been impossible of attainment.

Further, the bentonite having undergone the moisture content adjustment with a conventional method is turned into the granular lumps (of large grain size), causing a bentonite condition immediately after compaction to go into "raising". Thus, when the moisture content-adjusted bentonite obtained with the conventional method is compacted for the sake of use as a cut-off material, no cut-off performance could be expected before the bentonite in the form of granular lumps so swells in association with seepage as to fill up voids. Furthermore, the moisture content-adjusted bentonite obtained with the conventional method is lacking in uniformity of moisture content distribution, so that drying of the bentonite of this type causes remarkable shrinkage of its high moisture content portions, resulting in creation of a large number of great cracks.

The present invention is intended to provide a material moisture content adjustment method, which is adaptable, when making moisture content adjustment by adding liquid such as water to a raw material such as pulverulent material including bentonite, to uniformly mix the liquid such as water with the raw material such as pulverulent material using relatively simple facilities, also to easily attain moisture content adjustment of a large quantity of raw materials, and further to obtain a material having satisfactory performances such as impermeability through uniform moisture content adjustment.

DISCLOSURE OF THE INVENTION

The invention according to Claim 1 of the present invention relates to a method of adjusting a moisture content by adding liquid (water or other solutions) to a raw material such as pulverulent material and granular material, more specifically, a material moisture content adjustment method, which comprises: stirring and mixing a low-temperature raw material and fine granular ice, followed by restoring the raw material uniformly mixed with the fine granular ice to its normal temperature state to obtain a material of a prescribed moisture content.

The present invention is to make the moisture content adjustment under low temperature environments by giving, after adding the granular ice to the material such as the pulverulent material having undergone adjustment to low temperatures, stirring and mixing of fellow pulverulent materials. The finer the granular ice used is, the moisture content of a mixture of the material such as the pulverulent material is made more uniform. Stirring and mixing are given using equipment such as a mixing tank kept at low temperatures with gas such as low temperature gas. Otherwise, when the method of the present invention is taken in cold districts, utilization of the fallen snow and the cold weather permits contributions also toward a reduction in cost. Further, the method of the present invention is also adaptable to give stirring and mixing over forcible feeding in such a manner as to put the material such as the pulverulent material, together with the fine granular ice, into a pipe through which low-temperature gas is flowing.

With respect to the moisture content adjustment method according to Claim 1, the invention according to Claim 2 of the present invention relates to a material moisture content adjustment method, which comprises: providing a mixing tank, and putting fine granular ice into the mixing tank in such a manner as to, after sucking up liquid with low-temperature high-pressure gas (such as nitrogen gas), atomize the sucked-up liquid into the mixing tank, followed by giving, within the mixing tank kept at low temperatures, stirring and mixing of a low-temperature raw material and the fine granular ice.

The above method is adapted to meet batch-mannered moisture content adjustment by the use of the mixing tank, specifically, relates to a case where the fine granular ice is put into the low-temperature mixing tank while being prepared. For instance, the fine granular ice is supplied into the mixing tank by, after sucking up the liquid such as water from a container with low-temperature high-pressure nitrogen gas supplied from a liquid nitrogen bomb, atomizing the sucked-up liquid through a liquid atomizer, while cooling. Mere additional installation of simple equipment to a normal powder mixer is enough to permit uniform stirring and mixing of the material such as the pulverulent material and the fine granular ice.

With respect to the moisture content adjustment method according to Claim 1, the invention according to Claim 3 of the present invention relates to a material moisture content adjustment method, which comprises: providing a mixing tank, and putting prepared fine granular ice into the mixing tank, followed by giving, within the mixing tank kept at low temperatures, stirring and mixing of a low-temperature raw material and the fine granular ice.

The above method is adapted to meet batch-mannered moisture content adjustment by the use of the mixing tank, specifically, relates to a case where the prepared fine granular ice is put into the low-temperature mixing tank. For instance, after the material such as low-temperature preserved pulverulent material is received in the mixing tank kept at low temperatures with low-temperature nitrogen gas supplied from a liquid nitrogen bomb, the fine granular ice is put into the mixing tank placed in the above condition. In this case, mere additional installation of simple equipment to the normal powder mixer is also enough to permit uniform stirring and mixing of the material such as the pulverulent material and the fine granular ice.

With respect to the moisture content adjustment method according to Claim 1, the invention according to Claim 4 of the present invention relates to a material moisture content adjustment method, which comprises: providing a forcible feed pipe, and putting a low-temperature raw material and fine granular ice into the forcible feed pipe, followed by giving, within the forcible feed pipe kept at low temperatures with low-temperature high-pressure gas, stirring and mixing of the low-temperature raw material and the fine granular ice over forcible feeding through the low-temperature high-pressure gas.

The above method is adapted to meet continuous-mannered moisture content adjustment by the use of the forcible feed pipe, specifically, relates to a case where the material such as the pulverulent material and the fine granular ice are stirred and mixed within the forcible pipe. For instance, the material such as the low-temperature preserved pulverulent material and the fine granular ice are put into the forcible feed pipe kept at low temperatures with the low-temperature nitrogen gas supplied from a liquid nitrogen bomb, followed by being stirred and mixed while being forcibly fed through a low-temperature gas flow. Stirring and mixing of the material such as the pulverulent material and the fine granular ice are uniformly given with a relatively simple device, enabling the moisture content adjustment to be made continuously.

The present invention is particularly effective in making the moisture content adjustment of the bentonite, and involves use of the pulverulent bentonite and the fine granular ice available as the equivalent pulverulent material. Under the low temperature environments like the low-temperature mixing tank or forcible feed pipe, both the pulverulent bentonite and the fine granular ice take the form of fine grains, specifically, behave as pulverulent materials, and therefore, may be given stirring and mixing uniformly without absorption of water into the bentonite. Restoration of the pulverulent material to its normal temperature state after uniform mixing may cause the uniformly moisture content-adjusted bentonite to be obtained. In addition, mere mixing of the fellow pulverulent materials is enough, so that the need for the powerful mixer is eliminated, enabling use of the normal powder mixer to be made. Further, no cohesion of the material to the mixing blade and/or the mixing tank of the mixer is caused, enabling the moisture content adjustment of a large quantity of materials to be easily attained as well. Furthermore, pneumatic conveyance of the material such as the moisture content-adjusted pulverulent material becomes also attainable by giving stirring and mixing over forcible feeding through the low-temperature gas, and further keeping the mixture at low temperatures. Moreover, no possibility exists that the material such as the pulverulent material is turned into the granular lumps, resulting in almost no change in grain size distribution even after the moisture content adjustment. It is noted that the present invention is not limited to the moisture content adjustment of the bentonite, and applications to the moisture content adjustment of other types of pulverulent materials, granular materials and the like are possible as well.

The present invention is provided based on the above constitution, and thus may produce the following effects.

(1) The material such as the pulverulent material and the is fine granular ice are supposed to be stirred and mixed within the mixing tank kept at low temperatures or the forcible feed pipe kept at low temperatures. Thus, both the material such as the pulverulent material and the fine granular ice take the form of fine grains, specifically, behave as the pulverulent materials, and therefore, may be given stirring and mixing uniformly without absorption of water into the material such as the pulverulent material, enabling the uniformly moisture content-adjusted material to be obtained.

(2) With respect to the geological disposals of the radioactive wastes, satisfactorily impermeable bentonite-contained artificial barriers may be obtained with the bentonite having the uniform moisture content.

(3) Mere mixing of the fellow pulverulent materials is enough for the moisture content adjustment, so that the need for the powerful mixer is eliminated, enabling use of the normal powder mixer to be made, resulting in contributions toward a reduction in cost.

(4) In addition to elimination of the need for the powerful mixer, no cohesion of the material to the mixing blade and/or the mixing tank of the mixer is caused, enabling the moisture content adjustment of a large quantity of materials to be attained as well. Applications to huge-scale bentonite-contained artificial barriers with respect to the geological disposals of the radioactive wastes are supposed to be particularly effective.

(5) The pneumatic conveyance of the material such as the moisture content-adjusted pulverulent material becomes also attainable by giving stirring and mixing over forcible feeding through the low-temperature gas, and further keeping the mixture at low temperatures. Thus, the moisture content adjustment may be made continuously, enabling an increase in capacity to be easily attained.

(6) The material such as the moisture content-adjusted pulverulent material obtained with the conventional method is turned into the granular lumps (of large grain size), causing the material condition immediately after compaction to go into "raising". Conversely, the material such as the moisture content-adjusted material obtained with the method of the present invention results in almost no change in grain size distribution, and besides, causes an increase in dry density with respect to the same compaction energy, permitting uniform and dense conditions to be obtained immediately after compaction. Accordingly, when the material such as the pulverulent material is compacted for the sake of use as the cut-off material, it can be expected that a high cut-off performance is attainable with a low coefficient of initial permeability even immediately after seepage.

(7) The moisture content-adjusted bentonite obtained with the method of the present invention shows a uniform moisture content distribution, resulting in less creation of cracks even after dried. On the other hand, the moisture content-adjusted bentonite obtained with the conventional method is lacking in uniformity of the moisture content distribution, so that drying of the bentonite of this type causes remarkable shrinkage of its high moisture content portions, resulting in creation of a large number of great cracks.

BEST MODE FOR CARRYING OUT THE INVENTION

Figure 1:
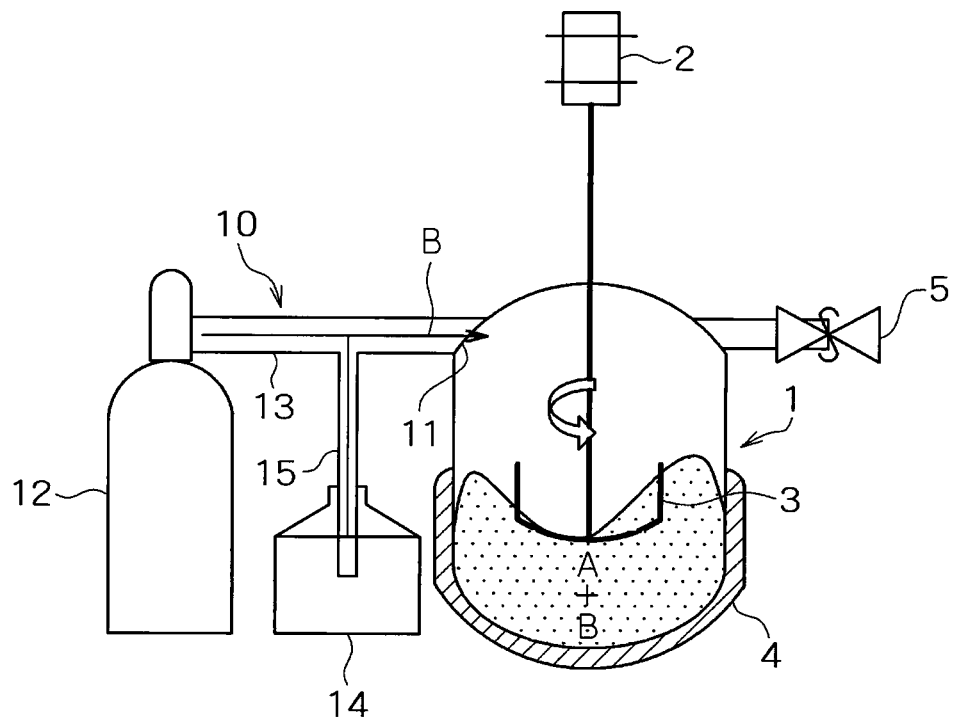
FIG. 1 is a sectional view showing a first embodiment of a moisture content adjusting apparatus for carrying out a moisture content adjustment method according to the present invention.
Figure 2:
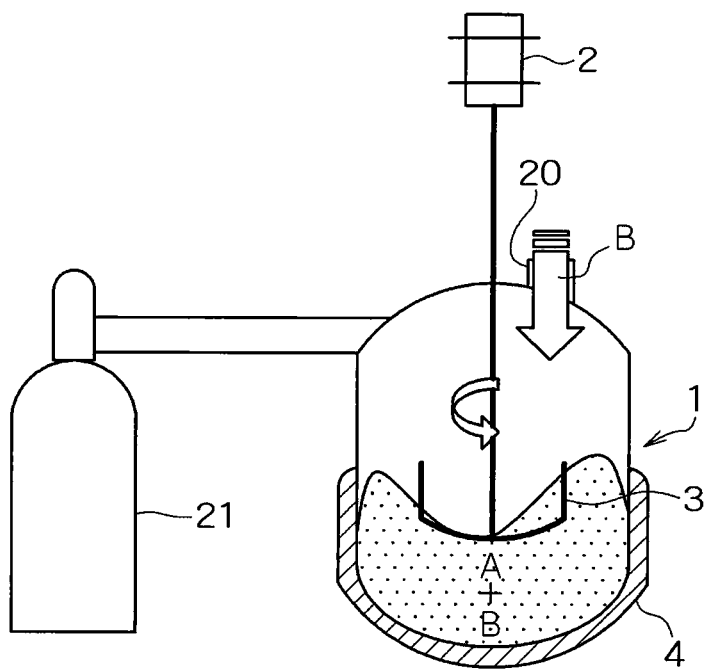
FIG. 2 a sectional view showing a second embodiment of the moisture content adjusting apparatus for carrying out the moisture content adjustment method according to the present invention.
Figure 3:
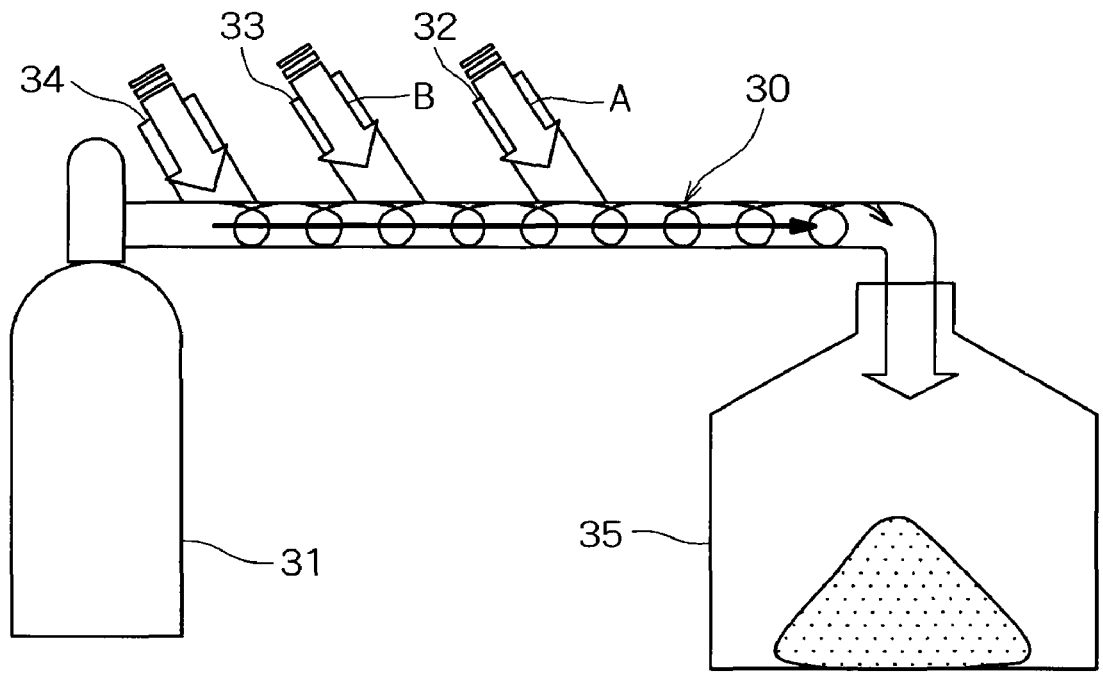
FIG. 3 is a sectional view showing a third embodiment of the moisture content adjusting apparatus for carrying out the moisture content adjustment method according to the present invention.

Hereinafter, the present invention is described with reference to illustrative embodiments. The embodiments shown are those applied to moisture content adjustment of bentonite. FIG. 1 shows a first embodiment of a moisture content adjusting apparatus for carrying out a moisture content adjustment method according to the present invention. FIG. 2 shows a second embodiment of the same, and FIG. 3 shows a third embodiment of the same.

The first embodiment shown in FIG. 1 relates to a batch-mannered moisture content adjusting apparatus, which involves use of a mixing tank 1 kept at low temperatures, and is adapted to give, within the mixing tank 1, stirring and mixing of pulverulent bentonite A and fine granular ice B, followed by restoring the pulverulent bentonite A uniformly mixed with the fine granular ice B to its normal temperature state to obtain prescribed moisture content bentonite.

A normal powder mixer having a mixing blade 3 rotationally driven by a motor 2 may be used for the mixing tank 1. The mixing tank 1 is configured as a low temperature tank in such a manner as to surround an outer circumference of a lower part of the tank with a heat-insulating material or a cooling jacket 4. The low-temperature preserved pulverulent bentonite A is put into the low-temperature mixing tank 1 obtained as described the above.

The fine granular ice B is supplied into the mixing tank 1 using a liquid atomizer 10, for instance. The normal powder mixer has, at its upper part, an inlet port 11, and a feed pipe 13 of a liquid-nitrogen bomb 12 is connected to the inlet port 11, permitting an upper end of a suction pipe 15 of a liquid container 14 to communicate with the middle of the feed pipe 13. Liquid such as water contained in the liquid container 14 is sucked up under negative pressure with low-temperature high-pressure nitrogen gas supplied from the liquid-nitrogen bomb 12, followed by being atomized into the mixing tank 1 while being cooled down with the nitrogen gas, causing the fine granular ice B to be supplied into the mixing tank 1. It is noted that a high-pressure relief valve 5 for making a relief from excessive pressure is connected to the upper part of the mixing tank 1.

Within the mixing tank 1, the pulverulent bentonite A and the fine granular ice B are given stirring and mixing by the mixing blade 3. Both the pulverulent bentonite A and the fine granular ice B take the form of fine grains, specifically, behave as the pulverulent materials, and therefore, may be uniformly mixed without absorption of liquid such as water into the bentonite. Restoration of the pulverulent bentonite to its normal temperature state after uniform mixing may cause the uniformly moisture content-adjusted bentonite to be obtained. With respect to the geological disposals of the radioactive wastes, satisfactorily impermeable bentonite-contained artificial barriers may be obtained with the bentonite having the uniform moisture content. It is noted that the liquid added to the bentonite is not limited to water, and use of various solutions is also included.

For this type of stirring and mixing, mixing of the fellow pulverulent materials is enough, so that the need for a powerful mixer is eliminated, enabling use of the normal powder mixer to be made. Further, no cohesion of the material to the mixing blade and/or the mixing tank is caused, enabling applications to the moisture content adjustment of a large quantity of materials, and hence, easy adaptations to construction of huge-scale bentonite-contained artificial barriers for the geological disposals of the radioactive wastes as well.

The moisture content-adjusted pulverulent bentonite results in almost no change in grain size distribution, and besides, causes an increase in dry density with respect to the same compaction energy as compared with a conventional method, so that uniform and dense conditions are obtained immediately after compaction. Thus, when the pulverulent bentonite is compacted for the sake of use as a cut-off material, it can be expected that a high cut-off performance is attainable with a low coefficient of initial permeability even immediately after seepage.

The moisture content-adjusted bentonite obtained with the conventional method is lacking in uniformity of moisture content distribution, so that drying of the bentonite of this type causes remarkable shrinkage of its high moisture content portions of the above bentonite, resulting in creation of great cracks. Conversely, the moisture content-adjusted bentonite obtained with the method of the present invention shows a uniform moisture content distribution, resulting in less creation of cracks even after dried.

The second embodiment shown in FIG. 2 relates to a batch-mannered moisture content adjusting apparatus, which has a fine granular ice inlet port 20 at the upper part of the same mixing tank 1 as that shown in FIG. 1, and is adapted to put prepared fine granular ice B into the mixing tank 1. A liquid-nitrogen bomb 21 is connected to the upper part of the mixing tank 1, causing the inside of the mixing tank 1 to be kept at low temperatures with the nitrogen gas supplied from the bomb 21. Within the mixing tank 1, the low-temperature preserved pulverulent bentonite A and the fine granular ice B are given stirring and mixing by the mixing blade 3. The same actions and effects as those in the previously described first embodiment shown in FIG. 1 are obtained.

Figure 4:
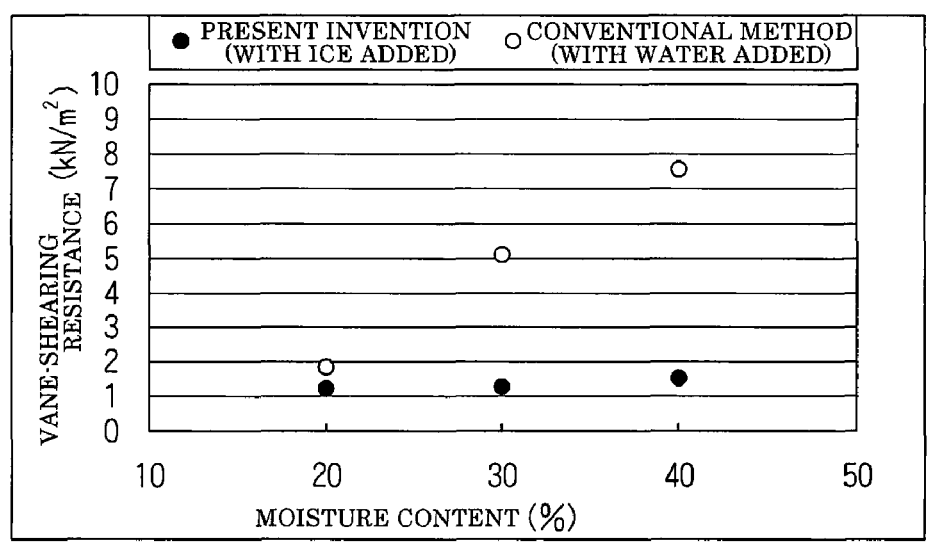
FIG. 4 is a graph showing a comparison in torque measured with a vane-sharing test between a method of the present invention and a conventional method.

Adjustment up to 100% moisture content having been supposed to be impossible of attainment with the conventional method by mixing even by the use of a large-sized mixer could be attained with a household table mixer thanks to the use of the fine granular ice according to the present invention. Further, even only slight stirring for about several seconds by human strength could bring sufficient moisture content adjustment into attainment without using the mixer. Furthermore, with respect to 20% target moisture content, the moisture content with the conventional method reached 20.4%, whereas 20.1% moisture content was obtained with the method of the present invention. FIG. 4 shows measured results, obtained with a vane-shearing testing apparatus, of required mixer torque for stirring and mixing according to the method shown in FIG. 2. The method of the present invention enables stirring and mixing to be given with low torque independently of the moisture content.

The third embodiment shown in FIG. 3 relates to a continuous-mannered moisture content adjusting apparatus, which is adapted to give, within a forcible feed pipe 30 kept at low temperatures, stirring and mixing of the low-temperature pulverulent bentonite A and the fine granular ice B without using the mixing tank, causing the pulverulent bentonite A uniformly mixed with the fine granular ice B to be obtained. A liquid-nitrogen bomb 31 is connected to the forcible feed pipe 30, causing the inside of the forcible feed pipe 30 to be kept at low temperatures with the low-temperature nitrogen gas supplied from the bomb 31. Further, there is provided a compressed air feed port 34 at the upstream side of a bentonite inlet port 32 and a fine granular ice inlet port 33, causing the pulverulent bentonite A and the fine granular ice B to be stirred and mixed while being forcibly fed through a low-temperature gas flow. In this case, the same actions and effects as those of the mixing tank are obtained as well. There is also provided a normal-temperature reservoir tank 35 at the end of the forcible feed pipe 30, causing the pulverulent bentonite A uniformly mixed with the fine granular ice B within the forcible feed pipe 30 to be restored to its normal temperature state, enabling the uniformly moisture content-adjusted bentonite to be obtained.

The low-temperature preserved pulverulent bentonite A and the same parts by weight of fine granular ice B as the pulverulent bentonite were put into the forcible feed pipe with a diameter of about 10 cm, followed by being stirred and mixed while being forcibly fed by a distance of about 5 m. The moisture content of the bentonite after forcible feeding reached 100%. Thus, it is seen that it is possible to attain mixing over forcible feeding with respect to even the high moisture content bentonite, which has been supposed to be impossible of attainment so far. It is also seen that it is possible to attain continuous-mannered moisture content adjustment.

It is noted that the foregoing has been described as related to the applications to the moisture content adjustment of the bentonite with respect to the projects of the geological disposals of the radioactive wastes, but is not limited to the above, and applications to the moisture content adjustment of other types of materials such as subsurface materials, pulverulent materials and granular materials are possible as well.

The invention claimed is:

1. A method of adjusting a moisture content of a pulverulent bentonite having an initial grain size distribution as a raw material for artificial barriers, comprising the steps of stirring and mixing fine granular ice and a low-temperature preserved amount of the pulverulent bentonite that is sufficiently cold to not melt the fine granular ice during the step of stirring and mixing, restoring the pulverulent bentonite homogeneously mixed with the fine granular ice to its normal temperature state to melt the fine granular ice and obtain bentonite having a uniform moisture content distribution and a restored grain size distribution that is substantially the same as said initial grain size distribution, and maintaining said restored bentonite with said uniform moisture distribution and restored grain size distribution as a raw material free of granular lumps tending to cause seepage and/or cracks in artificial barriers.

2. The method of claim 1, wherein, the stirring and mixing step is done without absorption of water by the bentonite.

3. The method of claim 1, wherein said artificial barrier formed of the restored bentonite has a higher dry density than an identically formed artificial barrier except for the use of liquid to obtain the same moisture content.

4. The method of claim 1, wherein said artificial barrier formed of the restored bentonite has a lower coefficient of initial permeability than an identically formed artificial barrier except for the use of liquid to obtain the same moisture content.

5. The method of claim 1, wherein said restored bentonite may be compacted to a selected dry density with a lower compaction energy than required to compact to said selected dry density an identically formed bentonite raw material except for the use of liquid to obtain the same moisture content.

6. The method of claim 1, further including providing said fine granular ice by aspirating water with a flow of low-temperature high pressure gas and freezing aspirated water in said flow of low-temperature high pressure gas to form said fine granular ice.

7. The method of claim 1, further including providing a mixing tank, cooling said mixing tank to a low temperature to inhibit melting of said fine granular ice, depositing said fine granular ice and low-temperature preserved pulverulent bentonite in said mixing tank and performing said stirring and mixing step within said mixing tank while maintaining said mixing tank at said low temperature.

8. The method of claim 1, further including providing a forcible feed pipe, cooling said forcible feed pipe to a low temperature to inhibit melting of said fine granular ice, putting said fine granular ice and low-temperature preserved pulverulent bentonite in said forcible feed pipe, and performing said stirring and mixing step within said forcible feed pipe while maintaining said forcible feed pipe at said low temperature.

9. The method of claim 1, further including providing said low-temperature preserved pulverulent bentonite and fine granular ice prior to said stirring and mixing step.

10. A method of adjusting a moisture content of a pulverulent bentonite having an initial grain size distribution as a raw material for artificial barriers, comprising the step of stirring and mixing fine granular ice and a low-temperature preserved amount of the pulverulent bentonite that is sufficiently cold to not melt the fine granular ice during the step of stirring and mixing, said stirring and mixing step being performed without the absorption of moisture by the bentonite, and restoring the pulverulent bentonite homogeneously mixed with the fine granular ice to its normal temperature state to melt the fine granular ice and obtain bentonite having a uniform moisture content distribution and a restored grain size distribution that is substantially the same as said initial grain size distribution, and maintaining said restored bentonite with said uniform moisture distribution and restored grain size distribution as a raw material for artificial barriers, whereby an artificial barrier formed of the restored bentonite has a higher dry density than an identically formed artificial barrier except for the use of liquid to obtain the same moisture content.

11. The method of claim 10, wherein said artificial barrier formed of the restored bentonite may be compacted to said higher dry density with a lower compaction energy than required to compact to said higher dry density an identically formed bentonite raw material except for the use of liquid to obtain the same moisture content.

12. The method of claim 11, further including providing said fine granular ice by aspiration of water with a flow of low-temperature high pressure gas and atomizing said aspirated water in said flow of low-temperature high pressure gas to form said fine granular ice.

13. The method of claim 11, further including providing a mixing tank, cooling said mixing tank to a low temperature to inhibit melting of said fine granular ice, depositing said fine granular ice and low-temperature preserved pulverulent bentonite in said mixing tank and performing said stirring and mixing step within said mixing tank while maintaining said mixing tank at said low temperature.

14. The method of claim 11, further including providing a forcible feed pipe, cooling said forcible feed pipe to a low temperature to inhibit melting of said fine granular ice, putting said fine granular ice and low-temperature preserved pulverulent bentonite in said forcible feed pipe, and performing said stirring and mixing step within said forcible feed pipe while maintaining said forcible feed pipe at said low temperature.

15. The method of claim 10, further including providing said low-temperature preserved pulverulent bentonite and fine granular ice prior to said stirring and mixing step.

16. The method of claim 10, wherein said low temperature preserved pulverulent bentonite and fine granular ice in the form of fine grains are blended together in said stirring and mixing step as pulverulent materials.

17. A method of adjusting a moisture content of a pulverulent bentonite as a raw material for artificial barriers, comprising the step of stirring and mixing fine granular ice and a low-temperature preserved amount of the pulverulent bentonite that is sufficiently cold to not melt the fine granular ice during the step of stirring and mixing, restoring the pulverulent bentonite homogeneously mixed with the fine granular ice to its normal temperature state to melt the fine granular ice and obtain bentonite having a uniform moisture content distribution, forming the restored bentonite into an artificial barrier, the artificial barrier having a higher dry density than an identically formed artificial barrier except for the use of liquid to obtain the same moisture content.

18. The method of claim 17, wherein the stirring and mixing step is done without absorption of water by the bentonite.

19. The method of claim 17, wherein said artificial barrier formed of the restored bentonite is compacted to said higher dry density with a lower compaction energy than required to compact to said higher dry density an identically formed artificial barrier of the same bentonite raw material except for the use of liquid to obtain the same moisture content.

\* \* \* \* \*